United States Patent [19]
Mokbel et al.

[11] Patent Number: 5,864,806
[45] Date of Patent: Jan. 26, 1999

[54] DECISION-DIRECTED FRAME-SYNCHRONOUS ADAPTIVE EQUALIZATION FILTERING OF A SPEECH SIGNAL BY IMPLEMENTING A HIDDEN MARKOV MODEL

[75] Inventors: Chafic Mokbel; Denis Jouvet, both of Lannion; Jean Monne, Perros Guirec, all of France

[73] Assignee: France Telecom, Cedex, France

[21] Appl. No.: 841,866

[22] Filed: May 5, 1997

[30] Foreign Application Priority Data

May 6, 1996 [FR] France ................................. 96 05629

[51] Int. Cl.$^6$ ........................................................ G10L 3/02
[52] U.S. Cl. ......................... 704/234; 704/242; 704/256
[58] Field of Search ................................... 704/234, 242, 704/256

[56] References Cited

U.S. PATENT DOCUMENTS

| | | | |
|---|---|---|---|
| 5,590,242 | 12/1996 | Juang et al. | 704/242 |
| 5,664,059 | 9/1997 | Zhao | 704/254 |
| 5,778,336 | 7/1998 | Chou et al. | 704/222 |
| 5,806,029 | 9/1998 | Buhrke et al. | 704/244 |

FOREIGN PATENT DOCUMENTS 0 534837   3/1993   European Pat. Off. .

OTHER PUBLICATIONS

Database Inspec Institute of Electrical Engineers, Stevenage GB Inspec No. 5027846, Seymour et al. : "An HMM–based cepstral–domain speech enhancement system" XP002024668 –abstract –& International Conference on Spoken Language Processing 1994, vol. 3, 18–22, Sep. 1994, Yolohama , JP, pp. 1595–1598.

International Conference on Acoustics, Speech, and Signal Processing 1988, vol. 1, Apr. 11–14 1988, New York, NY, US. pp. 533–536, XP002024667 –Ephraim et al. : "On the application of hidden Markov models for enhancing noisy speech" –§4.

International Conference on Acoustics, Speech, and Signal Processing 1992, vol. 1, 23 –26, Mar. 1992, San Francisco, CA, US, pp. 289–292, XP000341140 —Ephraim : "Speech enhancement using state dependent dynamical system model"–§IV.

Lionel DelphinPoulat and Chafic Mokbel, "Frame–Synchronous Adaptation of Cepstrum by Linear Regression, " Proc. 1997 IEEE Workshop on Automatic Speech Recognition and Understanding, pp. 420–427, Dec. 1997.

*Primary Examiner*—David R. Hudspeth
*Assistant Examiner*—Talivaldis Ivars Šmits
*Attorney, Agent, or Firm*—Marshall, O'Toole, Gerstein, Murray & Borun

[57] ABSTRACT

For equalizing a speech signal constituted by an observed sequence of successive input sound frames, which speech signal is liable to be affected by disturbances, the speech signal is modelled by means of a hidden Markov model and, at each instant t: equalization filters are constituted in association with the paths in the Markov sense at instant t; at least a plurality of the equalization filters are applied to the frames to obtain, at instant t, a plurality of filtered sound frame sequences and an utterance probability for each of the paths respectively associated with the equalization filters applied; the equalization filter corresponding to the most probable path in the Markov sense is selected; and the filtered frame supplied by the selected equalization filter is selected as the equalized frame.

14 Claims, 2 Drawing Sheets

DECISION-DIRECTED FRAME-SYNCHRONOUS ADAPTIVE EQUALIZATION FILTERING OF A SPEECH SIGNAL BY IMPLEMENTING A HIDDEN MARKOV MODEL

TECHNICAL FIELD

The present invention relates to a method and to apparatus for equalization filtering of a speech signal, by implementing a statistical model of the signal.

Below, the term "equalization" is used with an extended meaning as being synchronous to "attenuation of disturbances".

More particularly, the method and the apparatus of the present invention for filtering apply to a digital speech signal liable to be subjected to disturbances, and which constitutes the signal to be processed, or "clean" signal, by implementing a hidden Markov model (HMM) of the clean signal, or an approximation of the model of the clean signal as estimated from real data, together with functions for filtering by equalizing disturbances.

The method and apparatus of the present invention are applicable to improving methods of automatic speech recognition (ASR), in particular through the telephone network, whether the switched telephone network (STN) or the global system for mobile communications (GSM). Another application of the present invention lies in removing noise from speech signals.

BACKGROUND OF THE INVENTION

In ASR systems, when recognition is performed locally for voice control of "hands-free" telephones, computers, data terminals, or the like, known techniques seek to reduce disturbances introduced by additive noise. They include, in particular, filtering by spectrum subtraction, antenna filtering, Markov model state filtering, or in-line addition of room noise to reference models.

Markov state filtering consists in applying a spectrum subtraction filter (a Wiener filter) knowing the Markov model of the speech and the most probable state in which the system is to be found at an instant t. The clean signal model is given by the state of the Markov model, and the noise model is estimated from the silences preceding the word from which noise is to be removed.

For centralized recognition, the purpose of known techniques is to reduce the effects of telephone lines by subtracting the DC component from cepstrum vectors as estimated over a sufficiently broad horizon. For a digital telephone signal subdivided into windows, the notion of "horizon" designates a given integer number of successive windows. For a more detailed description of that type of approach, reference may be made to the article by C. Mokbel, J. Monné, and D. Jouvet, entitled "On-line adaptation of a speech recognizer to variations in telephone line conditions", Eurospeech, pp. 1247–1250, Berlin 1993. For a horizon that is broad enough, it is observed that the mean of the cepstrum vectors represents the effects of telephone lines, with this observation being particularly true when changes of channel characteristics take place slowly.

In general, a system for removing noise or for equalization is based on knowing the characteristics of the clean signal and the characteristics of the noise or the disturbances. Unfortunately, the system is much more complicated if the model of the clean system or its parameters are unknown.

For example, if it is assumed that a segment of clean speech is the output from an autoregressive system whose parameters are unknown, an "estimate-maximize" (EM) type method can be used for removing noise so as to obtain an estimate of the parameters of the autoregressive model and so as to filter out disturbances (see for example the article by G. Celeux and J. Diebolt, entitled "Une version de type recuit simulé de l'algorithme EM" [A simulated annealing type version of the EM algorithm], Rapports de Recherche No. 1123, Programme 5, INRIA, November 1989).

It is also possible to use blind equalization which is based on the statistics specific to the digital signal to determine the criterion for adapting the coefficients of the equalizer that performs equalization. In particular, document FR-A-2 722 631 describes an adaptive filter method and system using blind equalization of a digital telephone signal and the application thereof to telephone transmission and/or to ASR. The method described in that document is based entirely on general statistics relating to the speech signal and on the assumption of the telephone channel has a convolutive effect that is almost constant.

Such approaches give satisfactory results if simple assumptions can be made about the clean signal, i.e. if it can be assumed to be autoregressive and/or Gaussian and/or steady, but that is not always possible.

Other recent studies seek to use statistical vocabulary models in order to reduce the disturbances and/or variability of the speech signal, thereby enabling recognition to be more robust.

All of the above work suffers from the drawback of being incapable of providing an in-line application in a manner that is synchronous with the sound frame. The methods proposed wait until the end of the signal that is to be recognized, and then perform iterations for estimating biases before identifying the signal after noise removal or equalization. Further, estimators of the bias to be subtracted depend directly, or indirectly in a "estimate-maximize" method, on the best path in the Markov model, where a path or alignment in the Markov sense is an association between a run of sound frames and a run of states (or transitions) to which the probability densities of the model correspond. This dependency risks biasing the approach if the initial observation is highly disturbed, since such disturbances can give rise to false alignments.

The approach proposed by the present invention differs fundamentally from the approaches described previously, it is more general, and it remedies the above-mentioned drawbacks in that it is synchronous with the sound frame.

SUMMARY OF THE INVENTION

To this end, the present invention provides a method of equalizing a speech signal constituted by an observed sequence of successive input sound frames, which speech signal is liable to be affected by disturbances, in which method the speech signal is modelled by means of an HMM, the method being characterized in that, at each instant t:

equalization filters are constituted in association with the paths in the Markov sense at instant t, on the basis of a plurality of earlier sound frames and on the basis of a plurality of parameters of the Markov model;

at least a plurality of said equalization filters are applied to obtain, at instant t, a plurality of filtered sound frame sequences and an utterance probability for each of the paths respectively associated with the equalization filters applied;

the equalization filter corresponding to the path that is the most probable in the Markov sense is selected or "retained" i.e. the path having the highest utterance probability for the sequence of sound frames filtered by the corresponding applied equalization filter; and the filtered frame supplied by the retained equalization filter is retained as the equalized frame.

The present invention also provides equalization apparatus implementing the above method, characterized in that it comprises an equalization filter module receiving at its input the speech signal affected by disturbances and delivering at its output a speech signal with reduced disturbances.

Other characteristics and advantages of the present invention appear on reading the following description and observing the accompanying drawings.

DETAILED DESCRIPTION

Figure 1:
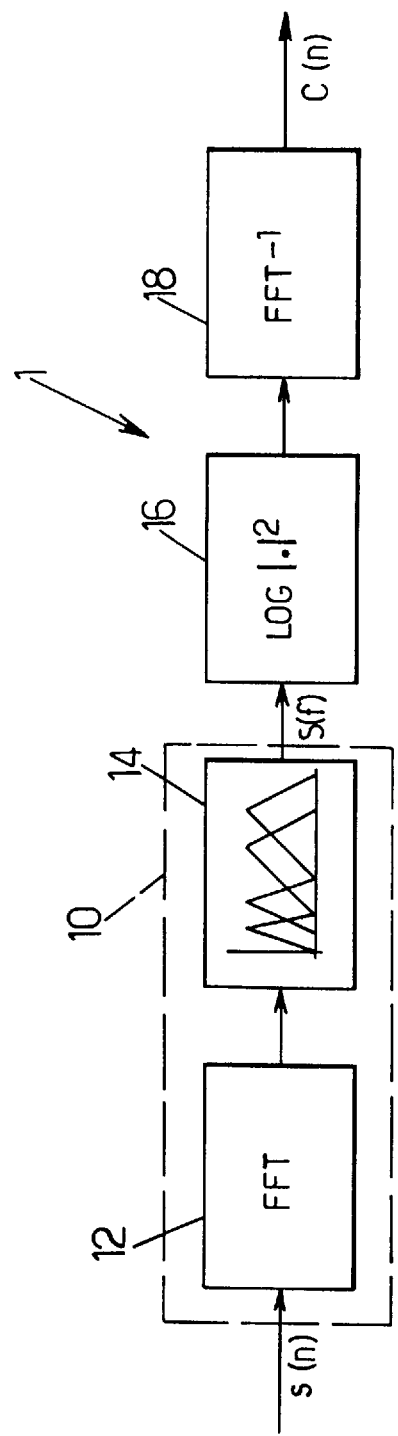
FIG. 1 is a schematic view of the module for computing the cepstrum of the speech signal in a particular embodiment, which module is included in the equalization filter module of the apparatus of the present invention.

In the description below, consideration is given to a speech signal constituted by an observed sequence $\underline{x}_1, \ldots, \underline{x}_t, \ldots, \underline{x}_{Tf}$ of successive sound frames, referred to as input sound frames. The index 1 in $\underline{x}_1$ represents a predetermined initial observation instant; the index t of $\underline{x}_t$ represents the current instant, and the index $T_f$ of $\underline{x}_{Tf}$ represents the final instant of the observed sequence. This speech signal is liable to be affected by disturbances.

It is assumed that the speech signal is generated by one or more mixtures whose parameters are known or can be estimated on a training sample. Thus, the signal can be seen as implementing an HMM, written $\lambda$. At a given instant, the observation is generated by one of the components of the mixture(s) associated with a Markov automaton. However, observing the signal does not make it possible to know what this component is, nor the corresponding mixture. The observations are said to be incomplete. All that is known are the parameters of the mixture(s), the parameters of the Markov automaton, and the nature of the disturbances affecting the observed signal.

HMMs are well known to the person skilled in the art, in particular in ASR. Reference on this topic can be made to the work by L. Rabiner and B. H. Juang, entitled "Fundamentals of speech recognition", Prentice Hall Signal Processing Series, A. V. Oppenheim Series editor, 1993, or to D. Jouvet's PhD thesis "Reconnaissance de mots connectés indépendamment du locuteur par des méthodes statistiques" [Speaker-independent recognition of connected words by statistical methods], E. N. S. T., 1988.

It is recalled that an HMM is constituted by a Markov automaton defined by a certain number of parameters: its states or transitions $q_1, \ldots, q_n$ (where N is the number of states of the model), the transitions between these states, and the utterance densities of an observation vector being in a given state (or for a given transition). Thus, three sets of parameters describe the HMM $\lambda$:

the set of probabilities that a state $q_i$ will be occupied at the initial instant $t_o$, written $\pi(q_i)$;

the set of probabilities of transition from a state $q_i$ to a state $q_j$, written $a_{qi\text{-}qj}$ and assumed to be independent of time; and the set of utterance probabilities for an observation vector $\underline{x}$ being in a given state $q_i$, written $b_{qi}(\underline{x})$; these probabilities are assumed below to obey a Gaussian probability relationship, having a mean vector $\underline{m}_{qi}$ and a covariance matrix $\underline{R}_{qi}$.

In this case, utterance probabilities are associated with the states of the Markov automaton. However, they could equally well be associated with the transitions: this does not change the essential characteristics of the invention in any way.

The following notation is used $\lambda=(\pi,a,b)$.

In this model and as recalled above, a path of length t in the Markov sense is an association between a run of t frames and a run of t states to which probability densities of the model correspond. To simplify, it is assumed that a path is a run s of t states or transitions $q_1, \ldots, q_t$. The following notation is used $s=\{q_1, \ldots, q_t\}$.

Disturbances in the observed signal are reduced by applying an equalization function to each frame $\underline{x}_t$ thereof, which function is associated with an equalization filter or equalizer.

Figure 2:
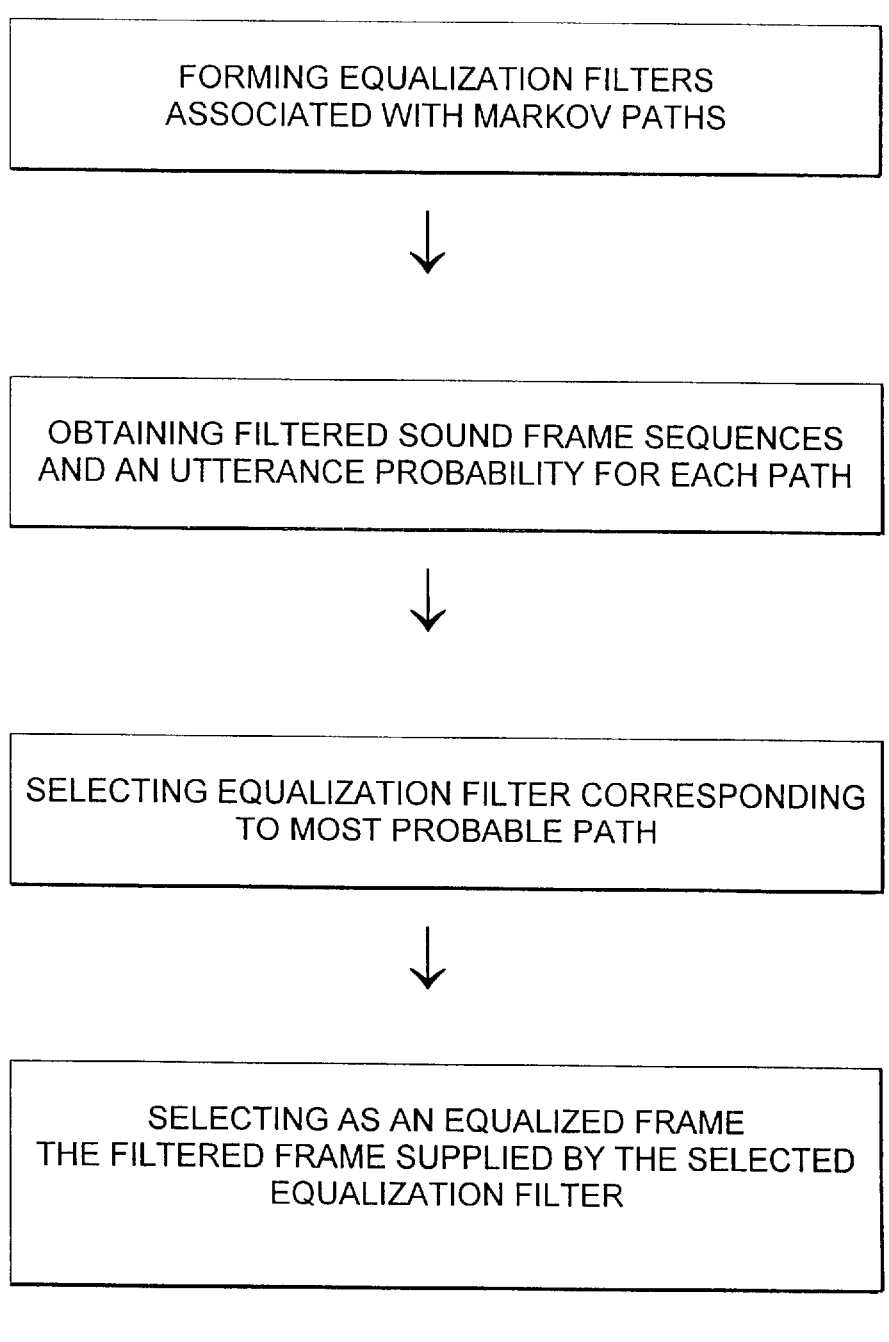
FIG. 2 is a flow chart illustrating the successive steps of the method according to the invention.

In the method of the present invention, as shown in FIG. 2, at each instant t, as described in detail below, equalizers are constituted in association with the paths present in the Markov automaton at instant t. Thus, variation of a path or alignment in the automaton depends not only on the observed signal at a given instant, but also on the state of the equalizer carried by the path, said equalizer being applied to the observed frame at each instant.

The notation $F_{\theta(s)}(.)$ is used below to designate the function associated with the equalizer carried by path s. It is parameterized by a vector $\theta(s)$.

At a given instant t, for a given path s, and knowing the parameters of the HMM $\lambda$, an estimate of the best parameter vector, written $\bar{\theta}_t(s)$ of the equalization function is sought. Knowing the model $\lambda$ and by applying the maximum likelihood method, this vector is estimated by the parameter vector having maximum utterance probability for the sound frame sequence $F_{\theta(s)}(\underline{x}_{t0}), \ldots, F_{\theta(s)}(\underline{x}_t)$, which is the input sound frame sequence filtered by the equalizer carried by the path s. The following notation is used:

$$\bar{\theta}_t(s) = \text{argmax}_\theta[P(F_{\theta(s)}(\underline{x}_{t0}), \ldots, F_{\theta(s)}(\underline{x}_t), s/\lambda)]$$

Determining $\bar{\theta}_t(s)$ is thus the same as maximizing:

$$P(F_{\theta(s)}(\underline{x}_{t0}), \ldots, F_{\theta(s)}(\underline{x}_t), s/\lambda)$$

Given the above-recalled definition for the parameters of the Markov model, the following is obtained:

$$P(F_{\theta(s)}(\underline{x}_{t0}), \ldots, F_{\theta(s)}(\underline{x}_t), s/\lambda) = \prod_{\tau=t0}^{t} a_{q(\tau-1)\cdot q\tau} \cdot b_{q\tau}[F_{\theta(s)}(\underline{x})] = \prod_{\tau=t_0}^{t} a_{q(\tau-1)\cdot q\tau} \cdot \frac{1}{(2\pi)^{p/2} \cdot \|R_{q\tau}\|^{1/2}} \cdot E \quad (1)$$

where:

$E = \exp[-\frac{1}{2} \cdot (F_{\theta(s)}(\underline{x}_\tau) - \underline{m}_{q\tau})^T \cdot \underline{R}_{q\tau}^{-1} \cdot (F_{\theta(s)}(\underline{x}_\tau) - \underline{m}_{q\tau})] \cdot \|J(\underline{x}_\tau)\|^{-4}$;

$t_0$ is a predetermined initial instant;

$\underline{m}_{q\tau}$ and $\underline{R}_{q\tau}$ are respectively the vector representing the mean and the covariance matrix associated with the probability relationship of a vector $\underline{x}_\tau$ being uttered in state or transition $q_\tau$;

$(.)^T$ designates the transposed matrix;

$(.)^{-1}$ designates the inverse matrix;

the notation $q(\tau-1)=q_{\tau-1}$ is used for greater clarity;

is the dimension of the observation space;

$a_{q(t0-1).qt0}$ represents the probability of occupying the initial state $q_{t0}$; and where $\underline{J}(\underline{x}_\tau)$ is a Jacobian matrix, in which the element located in the k-th line and the l-th column, where k and l are integers, is the derivative of the k-th element of the vector $\underline{x}_\tau$ with respect to the l-th element of the vector $F_{\theta(s)}(\underline{x}_\tau)$.

Maximizing $P(F_{\theta(s)}(\underline{x}_{t0}), \ldots, F_{\theta(s)}(\underline{x}_t), s/\lambda)$ amounts to maximizing $\log P(F_{\theta(s)}(\underline{x}_{t0}), \ldots, F_{\theta(s)(\underline{x}_t)}, s/\lambda)$, given that the logarithm function is a strictly increasing function. The following notation is used:

$$C_{q\tau} = \frac{1}{(2\pi)^{p/2} \cdot \|R_{q\tau}\|^{1/2}}$$

From expression (1) obtained above:

$$\log P(F_{\theta_{(s)}}(\underline{x}_{t0}), \ldots, F_{\theta_{(s)}}(\underline{x}_t), s/\lambda) = \sum_{\tau=t_0}^{t} \log(a_{q(\tau-1),q\tau} \cdot C_{q\tau}) - D$$

where:

$$D = 1/2 \cdot \sum_{\tau=t_0}^{t} (F_{\theta_{(s)}}(\underline{x}_\tau) - \underline{m}_{q\tau})^T \cdot R_{q\tau}^{-1} \cdot (F_{\theta_{(s)}}(\underline{x}_\tau) - \underline{m}_{q\tau}) + 2.\ln\|\underline{J}(\underline{x}_\tau)\|$$

where ln designates the natural logarithm.

Maximizing $\log P(F_{\theta(s)}(\underline{x}_{t0}), \ldots, F_{\theta(s)(\underline{x}_t)}, s/\lambda)$ thus amounts to minimizing the following expression:

$$1/2 \cdot \sum_{\tau=t_0}^{t} (F_{\theta_{(s)}}(\underline{x}_\tau) - \underline{m}_{q\tau})^T \cdot R_{q\tau}^{-1} \cdot (F_{\theta_{(s)}}(\underline{x}_\tau) - \underline{m}_{q\tau}) + 2.\ln\|\underline{J}(\underline{x}_\tau)\|.$$

Minimizing this expression amounts to differentiating relative to $\theta$ and finding the value of $\theta$ for which the derivative is zero. It is assumed that the function $F_{\theta(s)}(.)$ is differentiable relative to $\theta(s)$. Differentiating, together with the condition that the derivative is zero, gives rise to the following equation:

$$\sum_{\tau=t_0}^{t} (F_{\theta_{(s)}}(\underline{x}_\tau) - \underline{m}_{q\tau})^T \cdot R_{q\tau}^{-1} \cdot \frac{\partial F_{\theta_{(s)}}(\underline{x}_\tau)}{\partial \theta} + \frac{\partial \ln\|\underline{J}(\underline{x}_\tau)\|}{\partial \theta} = 0 \quad (2)$$

where:

$(.)^{-1}$ designates the inverse matrix; and $$\frac{\partial}{\partial \theta}$$

designates partial differentiation relative to $\theta$.

In equation (2), for particular types of the equalization function $F_{\theta(s)}(.)$, the second term of the sum, i.e.

$$\frac{\partial \ln\|\underline{J}(\underline{x}_\tau)\|}{\partial \theta},$$

disappears, as will be described later.

Equation (2) makes it possible to estimate the parameters of the equalizer having the function $F_{\theta(s)}(.)$, and carried by the path s. It can be seen that the only assumption made is that the equalization function is differentiable. The resulting equation thus makes it possible to determine the equalizer completely, in particular regardless of the nature of the disturbances, and regardless of the nature of the observed sequence $\underline{x}_1, \ldots, \underline{x}_\tau$.

The equalization method of the present invention can be implemented in two fundamental modes: it can be applied to filtering; and it can be applied to robust recognition.

In the first implementation, i.e. filtering, in order to produce an equalized frame at a given instant, consideration is given only to the equalizer carried by the most probable path.

Thus, to filter disturbances that affect the sound frame $\underline{x}_{t+1}$, only the equalizer having the following function is applied: $F_{\overline{\theta}t}(\overline{s}(t))$, where:

$\overline{\theta}_t(s)$ is the best parameter vector as defined above, i.e. the best parameter vector for the equalizer having the function $F_{\overline{\theta}t}(s)$; and $\overline{s}(t)$ is the path that is most probable in the Markov sense, i.e.:

$$\overline{s}(t) = \mathrm{argmax}_s[P(F_{\overline{\theta}(s)}(\underline{x}_1), \ldots, F_{\overline{\theta}(s)}(\underline{x}_t), s/\lambda)] \quad (3)$$

i.e. the path having the maximum transmission probability, knowing $\lambda$, for the filtered sound frame sequence $F_{\overline{\theta}}(s)(\underline{x}_1), \ldots, F_{\overline{\theta}}(s)(\underline{x}_t)$.

In the second implementation, i.e. robust recognition, after waiting for the end of the uttered words, the word to be recognized is identified from the most probable path in the HMM, knowing that the equalizers in the various paths are in operation throughout sound decoding, i.e. while progress is taking place along the paths or alignments with new observations arriving.

Thus, in robust recognition, to filter the disturbances which affect the sound frame $\underline{x}_{t+1}$ (a priori filtering) or the sound frame $\underline{x}_t$ (a posteriori filtering), the equalizer is applied having the function $F_{\overline{\theta}t}(s)$ for each of the paths s of the Markov automaton. A recognition decision is taken at the final instant $T_f$ of the observed sequence of successive input sound frames: the most probable path $\overline{s}(T_f)$ at instant $T_f$ is selected as being the path which satisfies:

$$\overline{s}(T_f) = \mathrm{argmax}_s[P(F_{\overline{\theta}(s)}(\underline{x}_1), \ldots, F_{\overline{\theta}(s)}(\underline{x}_{T_f}), s/\lambda)].$$

In theory, equation (3) requires the probability to be calculated at each instant t for all of the paths of a model starting from the initial instant. The corresponding implementation becomes very expensive in complexity and thus in computation time if the equalization function is complex.

In practice, in order to avoid that snag, computation is reduced by implementing an adaptive procedure, which takes into account only the i first points of the path s for estimating the best parameter vector $\overline{\theta}_i(s)$ for the equalizer carried by the path, i being an integer in the range 1 to t.

Thus, in the first implementation, the path selected as being the most probable is the path which satisfies the approximation:

$$\overline{s}(t) = \mathrm{argmax}_s[P(F_{\overline{\theta}1(s)}(\underline{x}_1), \ldots, F_{\overline{\theta}t(s)}(\underline{x}_t), s/\lambda)]$$

where $\overline{\theta}_i(s)$ is the best vector of equalizer parameters having the function $F_{\overline{\theta}i}(s)$ as estimated over the i first points of the path s.

Analogously, in the second implementation, the path selected as being the most probable is the path which satisfies the approximation:

$$\overline{s}(T_f) = \mathrm{argmax}_s[P(F_{\overline{\theta}1(s)}(\underline{x}_1), \ldots, F_{\overline{\theta}Tf(s)}(\underline{x}_{Tf}), s/\lambda)]$$

where $\overline{\theta}_i(s)$ is the best vector of equalizer parameters having the function $F_{\overline{\theta}i}(s)$ as estimated over the i first points of the path s.

It is clear that this organization does not modify the functions for estimating the parameters of the equalizers carried by the various paths. Nevertheless, ___ it can have an influence on the ordering of the paths as a function of their probabilities. To reduce the effects of this approximation while conserving computation complexity that is reasonable, it is possible to adjust probabilities over the m most recent frames where m is a predetermined integer. It can be shown that such adjustment does not increase computation complexity.

For the same purpose of reducing the amount of computation, another approximation is also made in practice. If, at each instant t, it were necessary to store the filters for all of the possible paths in an N-state HMM, then there would be $N^{Tf}$ filters. That is not possible in practice. It is possible to retain only the K best paths, where K is a predetermined integer. In a particular embodiment relating to an ASR system that uses the Viterbi algorithm, at each instant only the best path leading to a given state is retained; consequently the number of filters is reduced to N, where N is the above-specified number of states.

Still for the purpose of reducing the amount of computation, it is possible to quantify the parameter vectors θ(s). It is also possible to group the equalization functions together into families associated with respective common sound units, such as phonemes.

The disturbances encountered may be of convolutive and/or of additive nature.

As an example of an additive disturbance, mention can be made of engine noise or of horn noise, in addition to speech; that can happen, for example, when a motorist is telephoning from inside a vehicle, or when a pedestrian is telephoning from a road traffic environment, or more generally from a noisy environment.

There can also be disturbances that vary little over time. In which case, forgetting factors can be included in the estimate.

Disturbances may also consist in constant bias accompanied by fluctuation around said bias.

Two particular types of equalization function implemented by the method of the present invention are described below. These two particular equalization functions are applied respectively to two fundamental types of disturbance.

The first equalization function subtracts a bias from the sound frames. This function assumes that a large convolutive effect due to the transmission channel, and to a speaker effect, is present and is to be reduced.

The second equalization function is an affine function which makes use of multiple linear regression. It is advantageously applicable to a disturbance constituted by a large amount of additive noise.

For the first equalization function, i.e. when suppressing bias, it can be shown from the general equation (2) for estimating equalizer parameters, that the equalizer has the following function for each path:

$F_\theta(\underline{x}) = \underline{x} - \underline{b}$ where $\theta = \underline{b}$, and $\underline{b}$ is given by:

$$\underline{b}^T = \left[ \sum_{\tau=t_0}^{t} (\underline{x}_\tau - \underline{m}_{q\tau})^T \cdot \underline{R}_{q\tau}^{-1} \right] \cdot \left[ \sum_{\tau=t_0}^{t} \underline{R}_{q\tau}^{-1} \right]^{-1} \quad (4)$$

In that case, in equation (2), the second term of the sum disappears.

Intermediate calculations (not shown herein) enable above estimation equation (4) to be interpreted as follows. The bias for a given path is the sum of the differences between the vectors of the corresponding means on the path, which differences are weighted by the inverses of the variances about the means (the greater the variance, the less the weight of the difference in the sum), and with the sum being weighted by the inverse of the sum of the inverses of the variances along the path under consideration (the estimated bias thus does indeed have the dimension of a sound vector).

In the second equalization function, i.e. when using multiple linear regression, it can be shown from the general equation (2) for estimating the parameters of the equalizer, that disturbances are filtered by multiple linear regression by means of an equalizer having the following affine function for each path:

$F_\theta(\underline{x}) = \underline{A} \underline{x} + \underline{b}$ where $\theta = (\underline{A}, \underline{b})$ where $\underline{A}$ is a square matrix and $\underline{b}$ is a column vector.

In a particular implementation, the matrix $\underline{A}$ is diagonal.

It can be shown that the regression is a ratio of the vectors of the means and the vectors of the weighted sound frames along the path under consideration.

There follows a description of various particular embodiments of apparatus of the invention.

The equalization apparatus implementing the above-described method includes an equalization filtering module. This module has an input receiving the speech signal affected by disturbances, subjects the said signal to the set of filter operations in accordance with the above method, and delivers an output speech signal in which disturbances are reduced.

The sound frames $\underline{x}_1, \ldots, \underline{x}_t, \ldots, \underline{x}_{Tf}$ are selected so as to represent the most pertinent possible information contained in the signal.

For an ASR application, cepstrum vectors constitute a non-limiting example of suitable sound frames. Generally only the first ten or so cepstrum coefficients are taken into consideration. They model the impulse response of the vocal tract in fairly satisfactory manner, and thus carry the information which is pertinent for recognition. In addition, these coefficients are insensitive to the energy of the input signal, and that constitutes a quality criterion in ASR.

The cepstrum vectors can be computed from the speech signal on time windows which overlap partially. The windows may be of fixed time length, e.g. lying in the range 10 ms to 40 ms.

In an ASR application, FIG. 1 represents a particular embodiment of a module 1 for cepstrum computation included in the equalization filtering module.

At the input of the ASR system, a conventional type digitizing module (not shown) transforms the analog speech signal into a digital speech signal s(n). The signal s(n) is applied to the input of the module 1.

At its input, the module 1 has a module 10 for computing the spectrum energy of the speech signal. The module 10 has a fast Fourier transform module 12 which outputs the spectrum of the signal.

The output of the module 12 is connected to the input of a filter bank 14 which smooths the spectrum for spectrum envelope estimation: the critical bands of the filter bank 14 are distributed on a non-linear scale, the Mel scale or the Bark scale, thereby providing greater spectrum resolution for low frequencies than for high frequencies, thus matching more closely the human auditory system; it has been shown that the auditory system analyzes low frequencies at higher resolution than it analyzes high frequencies. Typically, the filter bank 14 has twenty-four frequency bands.

For each window of the signal, the output from the filter bank 14 provides a vector constituted by the spectrum energies in the twenty-four frequency bands, constituting a smoothed spectrum S(f).

The output from the filter bank 14, which is also the output from the module 10 for computing spectrum energy, is connected to the input of a module 16 for calculating the logarithm of the spectrum energy of the speech signal. The output of the module 16 is connected to the input of a module 18 for performing an inverse Fast Fourier Transform, in which the inverse Fourier transform is implemented by means of an inverse cosine transformation. The module 18 outputs the cepstrum C(n) of the speech signal s(n), in the form of a set of cepstrum vectors known as Mel frequency-based cepstral coefficients (MFCC).

The method and the apparatus of the present invention have the advantage of being easily combined with any signal preprocessing method or apparatus.

The results obtained by using the method and the apparatus of the present invention are very satisfactory. In particular, in ASR, they cause the error rate to drop by as much as 30% under certain conditions.

We claim:

1. A method of equalizing a speech signal constituted by an observed sequence of successive input sound frames, which speech signal is liable to be affected by disturbances, said method comprising a preliminary step of modelizing the speech signal by a hidden Markov model and, at each instant t, the further steps of:

(a) forming a plurality of equalization filters associated with paths in the Markov sense at instant t, on the basis of a plurality of earlier sound frames and on the basis of a plurality of parameters of the Markov model;

(b) applying at least a plurality of said equalization filters to said frames to obtain, at instant t, a plurality of filtered sound frames sequences and an utterance probability for each of the paths respectively associated with the equalization filters applied;

(c) selecting that one of said equalization filters which corresponds to a most probable path, in the Markov sense, which is that of said paths which has a highest utterance probability of the sequence of sound frames filtered by the corresponding applied equalization filter; and (d) selecting as an equalized frame the filtered frame supplied by the selected equalization filter.

2. A method according to claim 1, wherein each sound frame is represented by a vector $\underline{x}_t$, a path having a length t in the Markov sense is a sequence of t states or transitions $s=\{q_1, \ldots, q_t\}$, and that of said equalization filters which is associated with path s is defined by a function $F_{\theta(s)}(.)$, where $\theta(s)$ is a vector consisting of parameters of the equalization filter associated with path s, wherein, during step (a), that of equalization filters which is associated with path s is defined by a function $F_{\theta(s)}(.)$ whose parameters are estimated, for each path s, by equation $$\sum_{\tau=t_0}^{t} (F_{\theta(s)}(\underline{x}_\tau) - \underline{m}_{q\tau})^T \cdot R_{q\tau}^{-1} \cdot \frac{\partial F_{\theta(s)}(\underline{x}_\tau)}{\partial \theta} + \frac{\partial \ln\|\underline{J}(\underline{x}_\tau)\|}{\partial \theta} = 0$$

where $t_o$ is a predetermined initial instant, where $\underline{m}_{q\tau}$ is a vector representing a mean value and $R_{q\tau}$ is a covariance matrix, both associated with a probability law of utterance of a vector $\underline{x}_\tau$ in state or transition $q_\tau$, where $(.)^T$ designates the transposed matrix, where $(.)^{-1}$ designates the inverse matrix, where $$\frac{\partial}{\partial \theta}$$

designates the partial derivative with respect to $\theta$, and where $\underline{J}(\underline{x}_\tau)$ is a Jacobian matrix, in which an element located in a k-th line and a l-th column, where k and l are integers, is the derivative of a k-th element of the vector $\underline{x}_\tau$ with respect to a l-th element of $F_{\theta(s)}(\underline{x}_\tau)$.

3. A method according to claim 2, wherein the hidden Markov model is $\lambda$, comprising, during step (b), for filtering disturbances that affect a sound frame $\underline{x}_{t+1}$ (a priori filtering) or a sound frame $\underline{x}_t$ (a posteriori filtering), applying only that of the filters whose equalization function is $F_{\bar{\theta}t}(\bar{s}(t))$, where $\bar{\theta}_t(s)$ is a best parameter vector of the equalization filter whose function is $F_{\bar{\theta}}t$ (s), namely, $$\bar{\theta}_t(s) = \text{argmax}_\theta [P(F_{\theta(s)}(\underline{x}_{t0}), \ldots, F_{\theta(s)}(\underline{x}_t), s/\lambda)],$$

which is that parameter vector which has a maximum utterance probability of the filtered sound frame sequence $F_{\theta(s)}(\underline{x}_{t0}), \ldots, F_{\theta(s)}(\underline{x}_t)$ knowing $\lambda$, and where $\bar{s}(t)$ is a most probable path in the Markov sense, namely $$\bar{s}(t) = \text{argmax}_s [P(F_{\bar{\theta}(s)}(\underline{x}_1), \ldots, F_{\bar{\theta}(s)}(\underline{x}_t) s/\lambda)],$$

which is that of said paths which has a maximum utterance probability of the filtered sound frame sequence $F_{\bar{\theta}(s)}(\underline{x}_1), \ldots, F_{\bar{\theta}(s)}(\underline{x}_t)$ knowing $\lambda$.

4. A method according to claim 3, applied to robust speech recognition, wherein the most probable path $\bar{s}(T_f)$ is selected at a final instant $T_f$ of the observed sequence of successive input sound frames as being that of said paths which satisfies, $$\bar{s}(T_f) = \text{argmax}_s [P(F_{\bar{\theta}(s)}(\underline{x}_1), \ldots, F_{\bar{\theta}(s)}(\underline{x}_{Tf}), s/\lambda)].$$

5. A method according to claim 4, wherein the most probable path is selected as being that of said paths which satisfies the following approximation:

$$\bar{s}(T_f) = \text{argmax}_s [P(F_{\bar{\theta}1(s)}(\underline{x}_1), \ldots, F_{\bar{\theta}Tf(s)}(\underline{x}_{Tf}), s/\lambda)],$$

where $\bar{\theta}_i(s)$ is a best parameter vector of the equalization filter whose function is $F_{\bar{\theta}i}(s)$, estimated on the i first points of path s.

6. A method according to claim 3, wherein the most probable path is selected as being that of said paths which satisfies the following approximation:

$$\bar{s}(t) = \text{argmax}_s [P(F_{\bar{\theta}1(s)}(\underline{x}_1), \ldots, F_{\bar{\theta}t(s)}(\underline{x}_t), s/\lambda)],$$

where $\bar{\theta}_i(s)$ is a best parameter vector of the equalization filter whose function is $F_{\bar{\theta}i}$ (s), estimated on the i first points of path s.

7. A method according to claim 2, wherein for each path, the equalization filter has the following function:

$F_\theta(\underline{x}) = \underline{x} - \underline{b}$ where $\theta = \underline{b}$, and $\underline{b}$ is given by $$\underline{b}^T = \left[ \sum_{\tau=t_0}^{t} (\underline{x}_t - \underline{m}_{q\tau})^T \cdot \underline{R}_{q\tau}^{-1} \right] \cdot \left[ \sum_{\tau=t_0}^{t} \underline{R}_{q\tau}^{-1} \right]^{-1}.$$

8. A method according to claim 2, wherein said disturbances are filtered using linear multiple regression, by means of an equalization filter whose function is, for each path, an affine function:

$F_\theta(\underline{x}) = \underline{A}.\underline{x} + \underline{b}$, where $\theta = (\underline{A}, \underline{b})$, where $\underline{A}$ is a square matrix and $\underline{b}$ is a column vector.

9. A method according to claim 8, wherein said matrix $\underline{A}$ is diagonal.

10. A method according to claim 1, wherein said input sound frames are cepstrum vectors which are computed from the speech signal on time windows which overlap partially.

11. A method according to claim 1, wherein said disturbances are of convolutive and/or of additive nature.

12. A method according to claim 1, wherein said disturbances vary little over time.

13. An apparatus for equalizing a speech signal constituted by an observed sequence of successive input sound frames, which speech signal is liable to be affected by disturbances, comprising means for modelizing the speech signal by a hidden Markov model;

means for forming a plurality of equalization filters associated with paths in the Markov sense at instant t, on the basis of a plurality of earlier sound frames and on the basis of a plurality of parameters of the Markov model;

means for applying at least a plurality of said equalization filters to said frames to obtain, at instant t, a plurality of filtered sound frame sequences and an utterance probability for each of the paths respectively associated with the equalization filters applied;

means for selecting that one of said equalization filters which corresponds to a most probable path, in the Markov sense, which is the path having a highest utterance probability of the sequence of sound frames filtered by the corresponding applied equalization filter; and means for selecting as an equalized frame the filtered frame supplied by the selected equalization filter, said apparatus receiving at its input the speech signal affected by disturbances and delivering at its output a speech signal with reduced disturbances.

14. An apparatus according to claim 13, further comprising means for calculating a spectrum energy of the speech signal in a plurality of frequency bands and for outputting a spectrum of said sound frames of said speech signal;

means for calculating a logarithm of the spectrum energy of said sound frames, which are connected to an output of said means for calculating spectrum energy; and means for performing an inverse cosine transformation, which are connected to an output of said means for calculating spectrum energy logarithm, for outputting a cepstrum of said sound frames.

* * * * *